United States Patent Office 3,154,569
Patented Oct. 27, 1964

3,154,569
19-NITRILOSTEROIDS AND PROCESS FOR PRODUCING 19-NORSTEROIDS
Alberto Ercoli, Milan, and Rinaldo Gardi, Carate Brianza, Italy, assignors to Francesco Vismara S.p.A., Casatenovo (Como), Italy, a corporation of Italy
No Drawing. Filed Oct. 4, 1962, Ser. No. 228,242
Claims priority, application Italy Oct. 10, 1961
14 Claims. (Cl. 260—397.1)

The present invention is concerned with novel 19-nitrilosteroids and, more particularly relates to 19-nitrilo-$\Delta^5$-dihydroxy and diacyloxy steroids of the androstane and the pregnane series, to a method for their production and to a method for their conversion to $\Delta^4$-3-keto-19-norsteroids of the androstane and the pregnane series.

We have found that compounds of the general formula:

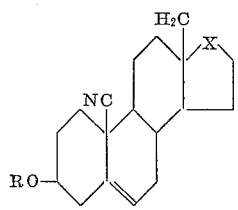

where X represents a group >CH—OR or a group

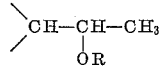

and R represents hydrogen or a hydrocarbon carboxylic acyl group containing from 1 to 8 carbon atoms, inclusive, are novel steroid derivatives useful as intermediates for the preparation of 19-norsteroid compounds.

The term "acyl" as used herein includes saturated and unsaturated lower aliphatic acyl, carboxy substituted lower aliphatic acyl, ether and ester substituted lower aliphatic acyl, benzoyl, substituted benzoyl, arylaliphatic and cycloaliphatic acyl. Representative esters of the Formula I are the formate, acetate, propionate, trimethylacetate, butyrate, benzoate, phenoxyacetate, enanthate, hemisuccinate, phenylpropionate and cyclopentylpropionate, the acetate being preferred.

According to the method of this invention the 19-nitrilo-$\Delta^5$-diacyloxy derivatives of the androstane and the pregnane series are produced in high yield and in a single step by dehydrating with phosphorus oxychloride a 19-oximino-6-hydroxy steroid of the general formula:

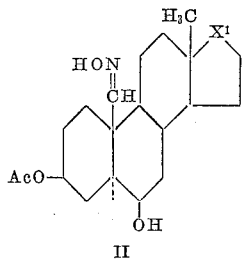

or the nitroso-dimer corresponding to the oxime as well as mixtures thereof.

In the Formula II, $X^1$ represents a group >CH—OAc or a group

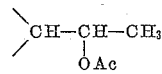

and Ac represents a hydrocarbon carboxylic acyl group of the type mentioned above. By submitting the 19-oximino of 3$\beta$,17$\beta$-diacyloxy-5$\alpha$-androstane-6$\beta$-ol or the corresponding nitroso-dimer or mixtures thereof to the action of phosphorus oxychloride as dehydrating agent, in the presence of a tertiary organic base as diluent of the reaction, there is obtained the corresponding 3$\beta$,17$\beta$-diacyloxy-5-androstene-19-nitrile. Similarly, 19-oximino-3$\beta$,20$\beta$-diacyloxy-5$\alpha$-pregnane-6$\beta$-ol or the corresponding nitroso-dimer or mixtures thereof are dehydrated with phosphorus oxychloride to produce 3$\beta$,20$\beta$-diacyloxy-5-pregnene-19-nitrile.

By subsequent hydrolysis with methanolic potassium or sodium hydroxide the diacyloxy groups are hydrolyzed, thus producing 5-androstene-3$\beta$,17$\beta$-diol-19-nitrile and 5-pregnene-3$\beta$,20$\beta$-diol-19-nitrile, respectively.

The 19-nitrilo-$\Delta^5$-dihydroxy and diacyloxy derivatives of the androstane and the pregnane series are then converted in good yield to $\Delta^4$-3-keto-19-norsteroids by a three-steps process, as shown by the following scheme:

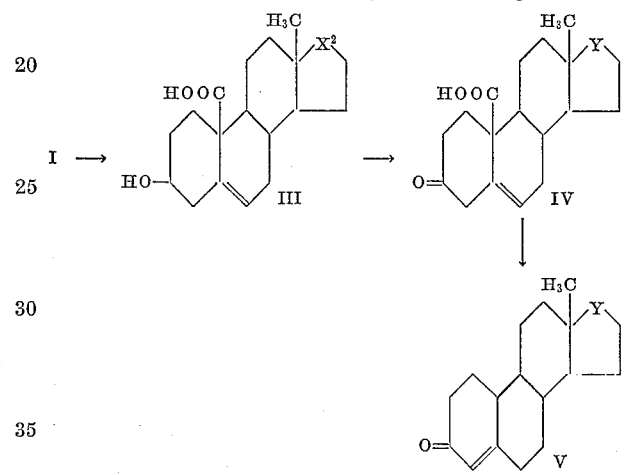

The compounds of Formula I are treated under energic conditions—under pressure and at a temperature of from about 150 to about 200° C.—with an alkali agent such as alkali metal hydroxides in an aqueous-alcoholic solution to achieve saponification of the cyano group to carboxy group and hydrolysis of the acyloxy groups, if present, thus forming the 19-carboxy derivatives of 3$\beta$,17$\beta$-dihydroxy-5-androstene and 3$\beta$,20$\beta$-dihydroxy-5-pregnene, respectively, as new intermediates of this invention (Formula III, where $X^2$ is a group >CH—OH or a group

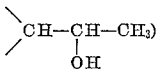

The 19-carboxy derivatives are then oxydized by treatment with chromic acid in acetone solution to form 3,17-diketo - 5 - androstene and 3,20-diketo - 5 - pregnene-19-carboxylic acid (Formula IV, where Y represents a carbonyl group >C=O or a group >CH—CO—CH$_3$). The decarboxylation at C–19 and the migration of the double bond from the 5–6 position to the 4–5 position to produce 19-norandrostenedione and 19-norprogesterone (V) are attained simultaneously by heating the 19-carboxy derivatives of Formula IV with trimethylaminoacetohydrazide hydrochloride or pyridinoacetohydrazide hydrochloride (Girard's reagent T or P) and acetic acid in an alcohol solution.

The 19-oximino compounds of Formula II above, employed as starting material for the process of this invention, are prepared by photochemical reaction of a 6$\beta$-nitrite derivative according to the method described by D. H. R. Barton (J. Am. Chem. Soc. 82, 2640; 1960). The 19-oximino compound may be also recovered at the end of the photolysis as 19-nitroso isomer in dimer form which compound may be directly employed as starting material.

The 3β,17β-diacyloxy-5α-androstane-6β-yl nitrite and the 3β,20β-diacyloxy-5α-pregnane-6β-yl nitrite, to be submitted to irradiation with ultraviolet light, are obtained according to known methods by treating with nitrosyl chloride in pyridine a 3β,17β-diacyloxy-6β-hydroxy androstane or a 3β,20β-diacyloxy-6β-hydroxy pregnane, respectively. Such compounds are in their turn prepared from the corresponding 3β,17β- or 3β,20β-dihydroxy-6-keto derivative by acylation of the hydroxy groups followed by reduction of the 6-keto group with sodium borohydride according to the method of Garmaise and Shoppee (J. Am. Chem. Soc. 1, 248; 1953).

The following examples illustrate the invention.

*Example 1*

A solution of 2.4 g. of 3β,17β-diacetoxy-5α-androstane-6-one (prepared by acetylation with acetic anhydride of the corresponding 3β,17β-dihydroxy compound) in 62 cc. of tetrahydrofuran and 6.2 cc. of water is treated under stirring with 600 mg. of sodium borohydride at room temperature for 4 hours. The excess of sodium borohydride is then decomposed by the addition of dilute acetic acid, the mixture poured into ice water and the precipitate formed is collected by filtration, washed with water and dried under vacuum, thus giving 2 g. of 3,17-diacetate of 5α-androstane-3β,6β,17β-triol. The product recrystallized from dilute methanol melts at 130–131° C.; $[α]_D^{27} = -30 \pm 1$ (chl. 0.5%).

To a solution of 1.2 g. of the diacetate of 5α-androstane-3β,6β,17β-triol in 20 cc. of dry pyridine, cooled to $-5°$ C., is added dropwise with stirring 1.6 cc. of nitrosyl chloride. Stirring is continued for 4 hours and the temperature maintained at $-5°$ C.; the mixture is then poured into ice water to precipitate the 5α-androstane-3β,17β-diacetoxy-6β-yl nitrite which is collected, washed with water and dried (yield 1.1 g.). After recrystallization from hexane-benzene the product melts at 152–153° C. (dec.); $[α]_D^{27} = -55 \pm 1$ (chl. 0.5%).

A solution of 5.8 g. of the nitrite in 100 cc. of dry toluene in a Pyrex vessel is irradiated by means of a 200-watt mercury arc lamp for 3 hours at a temperature of about 15° C., while a stream of dry nitrogen free from oxygen is passed into the vessel. During the photolysis the solution becomes turbid because the oximino derivative which formed separates.

The solid material is then filtered, washed with toluene, dried and recrystallized from benzene to give 3.2 g. of the nitroso-dimer corresponding to the 19-oximino-5α-androstane-3β,6β,17β-triol-3,17-diacetate, melting at 162–163° C.; $[α]_D^{27} = -79 \pm 1$ (chl. 0.5%).

A solution of 1.7 g. of the nitroso-dimer in 50 cc. of dry pyridine is treated, at a temperature around 0° C., by dropwise addition with 10 cc. of phosphorus oxychloride. The reaction mixture is stored at room temperature under anhydrous conditions for 20 hours, then poured into ice water and extracted with ether. The ethereal solution is washed with dilute hydrochloric acid and an aqueous solution of sodium bicarbonate, successively, then with water and, after being dried over magnesium sulphate, is concentrated to obtain 1.3 g. of 10-cyano-19-nor-5-androstene-3β,17β-diol, diacetate. The product melts at 160–161° C. after recrystallization from methyl alcohol; $[α]_D^{27} = -166 \pm 2$ (chl. 0.5%).

*Example 2*

Similarly, by substituing other 3,17-diacyl derivatives of 5α-androstane-3β,17β-diol-6-one for the steriod reactant in Example 1, the corresponding esters of 10-cyano-19-nor-5-androstene-3β,17β-diol are formed such as trimethylacetate, propionate, enanthate, phenoxy-acetate, benzoate, cyclopentylpropionate and the like.

*Example 3*

A solution of 1 g. of 10-cyano-19-nor-5-androstene-3β,17β-diol, diacetate in 40 cc. of ethanol is heated to reflux for 3 hours with 10 cc. of 2 N aqueous potassium hydroxide solution. After cooling, the alcohol is removed and water is added to precipitate the 10-cyano-19-nor-5-androstene-3β,17β-diol which is collected, washed with water, dried and recrystallized from ethanol. M.P. 209–210° C.; $[α]_D^{25} = -174°$ (dioxane). IR-spectrum: 3500, 2240, 1090 and 1056 cm.$^{-1}$.

*Example 4*

To a solution of 11.3 g. of diacetate of 5α-pregnane-3β,20β-diol-6-one in 110 cc. of tetrahydrofuran is added dropwise under stirring 45 cc. of an aqueous solution containing 1.1 g. of sodium borohydride. Stirring is continued for 8 hours at room temperature and then the excess of sodium borohydride is decomposed by addition of dilute acetic acid. By pouring the mixture into ice water a precipitate is formed which is filtered, washed with water and dried. There is thus obtained 8 g. of the diacetate of 5α-pregnane-3β,6β,20β-triol. The product recrystallized from hexane shows melting point 169–171° C.; $[α]_D^{25} = +3°$ (chl. 0.5%). IR-spectrum 3520 cm.$^{-1}$, 1734, 1712, 1250, 1025, 1023.

The above compound (5.2 g.) is dissolved in 30 cc. of dry pyridine, cooled at $-5°$ C. and treated little by little with 2 cc. of nitrosyl chloride, with stirring and maintaining the temperature around $-5°$ C. After further 4 hours at $-5°$ C. the mixture is poured into ice-water until complete precipitation of the product which is filtered and dried thus giving 5.2 g. of 3β,20β-diacetoxy-5α-pregnane-6β-yl nitrite. Recrystallization from methanol-methylene chloride yields the pure product melting at 153–154° C. (dec.); $[α]_D^{25} = -35°$ (chl. 0.5%). IR-spectrum: 1738 cm.$^{-1}$, 1633, 1245, 1031, 785.

A solution of 5 g. of the above compound in 100 cc. of anhydrous toluene is photolyzed in a Pyrex vessel at 10° C. under pure nitrogen, using a Q81 watt high pressure mercury lamp with a Pyrex filter immersed into the reaction solution. After 3 hours, at the end of the irradiation, the precipitate formed is filtered, washed with toluene and dried, thus obtaining 1.45 g. of 3β,20β-diacetoxy-19-nitroso-5α-pregnane-6β-ol (dimer) which recrystallized from acetone-hexane melts at 163–164° C.; $[α]_D^{25} = -43°$ (chl. 0.5%). By dilution of the mother liquor with petroleum ether there is obtained 1.2 g. of 3β,20β-diacetoxy-19-oximino-5α-pregnane-6β-ol. Total yield: 2.65 g. equal to 53%. The pure 19-oximino compound, recrystallized from ethyl acetate, shows melting point 218-219° C.; $[α]_D^{25} = -25°$ (chl. 0.5%). IR-spectrum: 3500 cm.$^{-1}$, 3240, 1732, 1712, 1244, 1025. No absorption in the ultraviolet.

A mixture of the 19-oximino compound and the nitroso-dimer (2 g.), as obtained above, is dissolved in 37 cc. of dry pyridine and treated with 6 cc. of phosphorus oxychloride. The mixture is kept at room temperature under anhydrous conditions for 15 hours, after which the product is precipitated by the addition of ice-water. There is thus obtained 1.6 g. of 10-cyano-19-nor-5-pregnene-3β,20β-diol diacetate. After recrystallization from methanol-methylene chloride the melting point is 189–190° C.; $[α]_D^{25} = -127° \pm 1$ (chl. 0.5%). IR-spectrum: 2240, 1732, 1250, 1039 cm.$^{-1}$.

*Example 5*

Similarly, by substituing other 3,20-diacyl derivatives of 5α-pregnane-3β,20β-diol-6-one for the steroid reactant in Example 4, the corresponding esters of 10-cyano-19-nor-5-pregnene-3β,20β-diol are formed such as for instance, the formate, propionate, enanthate, benzoate, p. oxybenzoate, cyclopentylpropionate and the like.

*Example 6*

A solution of 1 g. of one of the diesters above mentioned in 40 cc. of methanol is heated to reflux for 2 hours with 10 cc. of aqueous sodium hydroxide solution. By cooling and the dilution with water there is obtained 700 mg. of 10-cyano-19-nor-5-pregnene-3β,20β-diol melting at 272–273° C., after a recrystallization from methanol; [α]$_D^{25}$= —180° (chl. 0.5%). IR-spectrum: 3460, 2240, 1060 cm.$^{-1}$.

*Example 7*

To a solution of 3.5 g. of 10-cyano-19-nor-5-androstene-3β,17β-diol diacetate in 120 cc. of methanol is added a solution of 17 g. of sodium hydroxide in 50 cc. water and the mixture is placed in a copper tube and heated in a steel autoclave at a temperature around 185° C. for 3 hours. After cooling, the reaction mixture is filtered and partially concentrated under vacuum. By acidifying to Congo red with 10% hydrochloric acid, a precipitate is formed which is filtered, washed with water and dried to obtain 2.3 g. of 10-carboxy-19-nor-5-androstene-3β,17β-diol. The product purified by recrystallization from aqueous methanol and dioxane melts at 275–276° C. (dec.); [α]$_D^{27}$= —108±1 (ethanol).

To a suspension of the above compound (1 g.) in 120 cc. of anhydrous acetone, is added with stirring 2 cc. of a standard solution of chromic acid (prepared by treating 26.7 g. of chromium trioxide with 23 cc. of concentrated sulfuric acid and diluting the resulting mixture with distilled water to 100 cc.). A slow stream of pure dry nitrogen is passed into the solution before and during the oxidation. Agitation is continued at room temperature for additional 3 minutes, then the mixture is poured into ice-water and the product extracted with ether. The ethereal solution, washed and dried, gives by evaporation of the solvent 800 mg. of 10-carboxy-19-nor-5-androstene-2,17-dione. M.P. 159–160° C. (dec.) after a recrystallization from acetone; [α]$_D^{27}$= —11±1 (chl. 0.5%).

A solution of this compound (1 g.) in 70 cc. of methanol is treated with 25 cc. of glacial acetic acid and 1.5 g. of Girard's reagent T and the mixture heated to reflux for 2 hours. After cooling, the solution is poured into ice-water containing 20 g. of sodium carbonate. The non-ketnic fraction is extracted with ether and the mother liquor is acidified by addition of 10 cc. of concentrated hydrochloric acid and then extracted with several portions of ether. The combined extract is washed with water, dried over anhydrous sodium sulfate and the ether is evaporated to give 580 mg. of 19-nor-4-androstene-3,17-dione, M.P. 167–169° C., identical with an authentic specimen of the compound prepared by other way.

*Example 8*

6.2 g. of 10-cyano-19-nor-5-pregnene-3β,20β-diol (or of the corresponding 3,20-diacetate) are dissolved in a mixture of 180 cc. of methanol and 75 cc. of water containing 25 g. of sodium hydroxide. The resulting mixture is heated in autoclave at a temperature around 185° C. for 3 hours. After cooling, the mixture is filtered through animal charcoal, partially concentrated and acidified to Congo red with hydrochloric acid to give 4.2 g. of 10-carboxy - 19 - nor - 5-pregnene-3β,20β-diol. The product purified by recrystallization from methanol melts at 390–310° C. (dec.); [α]$_D^{25}$= —182° (pyridine 0.5%).

1 g. of the above compound, suspended in 300 cc. of dry pure acetone is treated with 4 cc. of a standard chromic acid solution prepared as in Example 7 and the reaction mixture stirred at room temperature and under nitrogen atmosphere for 30 minutes. After dilution with ice water saturated with sodium chloride, the mixture is thoroughly extracted with ether and the combined extracts washed with water and dried over anhydrous sodium sulfate. By elimination of the solvent, 565 mg. of 10-carboxy-9-nor-5-pregnene-3,20-dione is obtained which recrystallized from acetone melts at 162–163° C. (dec.); [α]$_D^{25}$=+24±1 (chl. 0.5%).

720 mg. of the carboxylic acid are dissolved in 56 cc. of methanol and heated to reflux for 3 hours with 19.6 cc. of glacial acetic acid and 1.12 g. of Girard's reagent T. After cooling, the mixture is poured into 280 cc. of ice-water containing 16 g. of sodium carbonate and the resulting solution is extracted with ether in order to remove the non-ketonic fractions. The alkaline aqueous solution is then acidified to Congo red with 40 cc. of concentrated hydrochloric acid and kept at room temperature for 2 hours. The mixture is successively extracted with several portions of ether and the combined extracts washed with dilute aqueous sodium bicarbonate solution and then with water, dried and evaporated to dryness. There is thus obtained 472 mg. of 19-norprogesterone melting at 144–145° C.; [α]$_D^{25}$=+147° (chl. 0.5%) after a recrystallization from acetone-hexane. The melting point is undepressed in admixture with an authentic specimen of 19-norprogesterone prepared by other way.

We claim:

1 A compound of the formula:

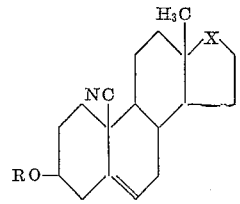

where X is a member selected from the group consisting of a group >CH—OR and a group $$\begin{matrix}\diagdown\\ \diagup\end{matrix}\text{CH—CH—CH}_3\\ \quad\quad\;\;|\\ \quad\quad\;\;\text{OR}$$

and R is a member selected from the group consisting of hydrogen and a hydrocarbon carboxylic acyl group containing up to 8 carbon atoms, inclusive.

2. The diacetate of 5-androstene-3β,17β-diol-19-nitrile.
3. The diacetate of 5-pregnene-3β,20β-diol-19-nitrile.
4. 5-androstene-3β,17β-diol-19-nitrile.
5. 5-pregnene-3β,20β-diol-19-nitrile.
6. 5-pregnene-3β,20β-diol-19-carboxylic acid.
7. A process of producing 19-norandrostenedione, comprising dehydrating with phosphorus oxychloride at least one member selected from the group consisting of a 19-oximino-3β,17β-diacyloxy-5α-androstane-6β-ol and a nitroso-dimer corresponding to said oxime to produce the corresponding 3β,17β-diacyloxy-5-androstene-19-nitrile, saponifying said last-mentioned compound with an alkali metal hydroxide in an aqueous-alcoholic solution at a temperature of from about 150° to about 200° C., oxidizing the thus formed 5-androstene-3β,17β-diol-19-carboxylic acid with chromic acid in acetone solution and decarboxylating the resulting carboxy-Δ$^5$-diketo steroid with acetic acid and a Girard's reagent selected from the group consisting of trimethylaminoacetohydrazide hydrochloride and pyridinoacetohydrazide hydrochloride.

8. The process of claim 7 wherein the acyloxy groups of the starting compound are acetoxy groups.

9. A process of producing 19-norprogesterone, comprising dehydrating with phosphorus oxychloride at least one member selected from the group consisting of a 19-oximino-3β,20β-diacyloxy-5α-pregnane-6β-ol and a nitroso-dimer corresponding to said oxime to produce the corresponding 3β,20β-diacyloxy-5-pregnene-19-nitrile, saponifying said last-mentioned compound with an alkali metal hydroxide in an aqueous-alcoholic solution at a temperature of from about 150° to about 200° C., oxidizing the thus formed 5-pregnene-3β,20β-diol-19-carboxylic acid with chromic acid in acetone solution and decarboxylating the resulting carboxy-Δ$^5$-diketo steroid with acetic acid and a Girard's reagent selected from the group consisting of trimethylaminoacetohydrazide hydrochloride and pyridinoacetohydrazide hydrochloride.

10. The process of claim 9 wherein the acyloxy groups of the starting compound are acetoxy groups.

11. A process of producing a 3β,17β-diacyloxy-5-androstene-19-nitrile comprising dehydrating with phosphorus oxychloride at least one member selected from the group consisting of a 19-oximino-3β,17β-diacyloxy-5α-androstane-6β-ol and a nitroso-dimer corresponding to said oxime.

12. The process of claim 11 wherein the acyloxy groups of the starting compound are acetoxy groups.

13. A process of producing a 3β,20β-diacyloxy-5-pregnene-19-nitrile, comprising dehydrating with phosphorus oxychloride at least one member selected from the group consisting of a 19-oximino-3β,20β-diacyloxy-5α-pregnane-6β-ol and a nitroso-dimer corresponding to said oxime.

14. The process of claim 13, wherein said acyloxy groups are acetoxy groups.

References Cited in the file of this patent

Barton et al.: J.A.C.S. 83, pages 4076–4083, October 5, 1961.

Gardi et al.: Gazz. Chim. Ital. 12, pages 1420–1430 (1961).

UNITED STATES PATENT OFFICE
CERTIFICATE OF CORRECTION

Patent No. 3,154,569                                October 27, 1964

Alberto Ercoli et al.

It is hereby certified that error appears in the above numbered patent requiring correction and that the said Letters Patent should read as corrected below.

Column 1, lines 19 to 26, the formula should appear as shown below instead of as in the patent:

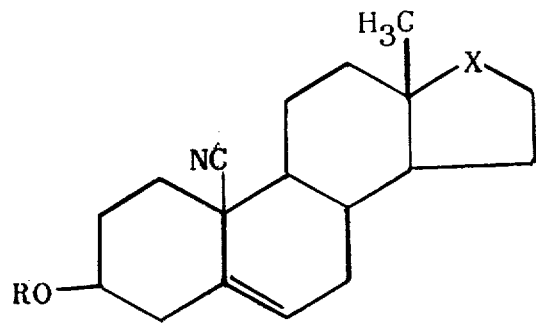

column 5, line 32, for "2,17-dione" read -- 3,17-dione --; line 39, for "non-ketnic" read -- non-ketonic --; line 59, for "390-" read -- 309- --; same column 5, line 70, for "10-carboxy-9-nor-" read -- 10-carboxy-19-nor- --.

Signed and sealed this 20th day of April 1965.

(SEAL)
Attest:

ERNEST W. SWIDER                               EDWARD J. BRENNER
Attesting Officer                              Commissioner of Patents